United States Patent [19]

Jones et al.

[11] 3,753,710

[45] Aug. 21, 1973

[54] PREPARATION OF CERAMICS

[75] Inventors: Rexford W. Jones; William B. Thompson, both of Columbus, Ohio

[73] Assignee: A. E. Staley Manufacturing Company, Decatur, Ill.

[22] Filed: June 28, 1971

[21] Appl. No.: 157,723

Related U.S. Application Data

[63] Continuation-in-part of Ser. Nos. 796,897, Feb. 5, 1969, abandoned, and Ser. No. 849,493, Aug. 12, 1969, abandoned, and Ser. No. 849,492, Aug. 12, 1969, abandoned, and Ser. No. 877,430, Nov. 17, 1969, abandoned, and Ser. No. 32,407, April 27, 1970, abandoned.

[52] U.S. Cl. .......................................... 96/36.1, 96/36

[51] Int. Cl. .......................................... G03c 5/00

[58] Field of Search ............... 96/36.1, 115 P, 27 R; 117/10, 13, 33.5 R, 33.5 C, 33.5 CM, 25

[56] References Cited

UNITED STATES PATENTS

| | | | |
|---|---|---|---|
| 3,236,647 | /1966 | Philpot | 96/34 |
| 2,090,450 | /1937 | Kogel | 96/48 |
| 708,918 | /1902 | Perrin | 96/34 |
| 3,365,292 | /1968 | Fiore et al. | 96/36.1 |

*Primary Examiner*—Norman G. Torchin
*Assistant Examiner*—Edward C. Kimlin
*Attorney*—William H. Magidson and Charles J. Meyerson

[57] ABSTRACT

Method for forming ceramics and more particularly for fabricating screens for colored television tubes comprising coating a cathode ray tube faceplate with a solid, light-sensitive organic layer capable of developing a $R_d$ of 0.2 to 2.2, preferably a $R_{dp}$ of 0.4 to 2.0; exposing said light-sensitive organic layer to actinic radiation in image-receiving manner to establish a potential $R_d$ of 0.2 to 2.2; applying to said layer of organic material, free flowing phosphor particles having a diameter, along at least one axis of at least about 0.3 micron but less than 25 times the thickness of said organic layer; while the layer is at a temperature below the melting points of the phosphor powder and of the organic layer, physically embedding said phosphor particles as a monolayer in a stratum at the surface of said light-sensitive layer to yield an image having portions varying in density in proportion to the exposure of each portion; removing non-embedded particles from said organic layer to develop a discrete phosphor pattern, repeating said process to deposit a second phosphor and firing said faceplate to remove all of the organic material on the surface of the faceplate and fuse the phosphors to said faceplate.

Ceramics may be processed in the same manner and in those cases where the ceramic pigment comprises a conductive metal, the technique can be employed to prepare ceramic circuit boards.

19 Claims, No Drawings

PREPARATION OF CERAMICS

DISCLOSURE OF THE INVENTION

This application is a continuation-in-part of application Ser. Nos. 796,897, 849,493, 849, 492, 877,430, and 32,407 filed Feb. 5, 1969, Aug. 12, 1969, Aug. 12, 1969, Nov. 17, 1969 and Apr. 27, 1970 respectively, all of which are abandoned.

This invention relates to methods of forming ceramics. More particularly, this invention relates to methods for fabricating screens for color television tubes wherein uniform layers of phosphor are deposited on the tube face as an intermediate step in the fabrication of such screens.

Image display screens for cathode ray tubes of the type adapted to be employed in color television viewing apparatus conventionally comprise a transparent viewing panel having a vast number of similar patterns discretely formed thereon. Each of the patterns may consist of groups of stripes, bars, or dots of red-emitting, green-emitting, and blue-emitting cathodoluminescent materials capable of color fluorescence under electron beam bombardment. A multi-color cathode ray tube screen of this type may be fabricated by sequential photographic printing procedures wherein a separate application of photosensitized material or resist is used to secure each of the specific color-emitting fluorescent materials to the internal concave face of the viewing panel. For example, in fabricating a dotted color screen by this process, a thin layer of a negative acting photosensitized substance and one of the fluorescent materials is disposed on the concave surface of the faceplate and discretely exposed to light irradiation directed through an appropriate negative or foraminous mask thereby causing the light impinged photosensitized substance to harden and adhere to the panel as a multitude of dot-like areas. The portions of the screen which are unexposed to light are not substantially hardened and are subsequently removed by dissolving the unhardened substance with a suitable solvent and rinsing same from the panel surface. The unexposed radiation sensitive binder and phosphor adhering thereto are removed in this way leaving a plurality of discrete elements on the screen. This means that well over two-thirds of the phosphor is removed with the unexposed light-sensitive binder. This procedure is repeated in forming the second and third color-emitting cathodoluminescent areas by utilizing, in each case, a new layer of photosensitized material, a different color-emitting phosphor and a differently oriented light source thereby providing a resultant multitude of adjacently related color triads comprising the screen of the tri-color picture tube viewing panel. The sequential order for applying the various color-emitting phosphor portions is not critical. A subsequent bakeout or firing disposes of the volatile ingredients leaving the phosphor patterned screen as a completed unit.

Prior to this invention, the deposition of the photosensitized resist material and the respective phosphor particles was accomplished by first depositing a film of the photosensitized material on the panel and disposing phosphor powder thereupon as by the well-known dusting or settling procedures or by the application of a suspension of phosphor in the photosensitized material as in the conventional slurry technique. Whichever method was utilized in forming the phosphor bearing film, the layer was substantially dried before being subjected to discrete light exposure.

Screen uniformity and color balance requires that the dots of the various color fields be of consistent size, be free of color contamination from adjacent color-emitting phosphors, and have adequate adherence to the panel surface.

Individual dot size and adherence are dependent upon several factors, such as mask aperture size, density of the phosphor particles contained in or on the photosensitized layer, and the time span of irradiation exposure which is related directly to the rate of hardening of the photosensitized layer.

The hardening of the material in the prior art negative acting sensitized layer is a time response which is accelerated by heat and light in substantially the ultraviolet range. Thus, the drying of the negative acting sensitized layer, which U.S. Pat. No. 3,380,826 indicates may be a period of from six to ten minutes at a temperature ranging from approximately 80° to 100° F., initiates what is called a dark hardening reaction over the whole of the screen area, which tends to affix phosphors in the image and non-image areas uniformly to the sensitized layer. While not a rapid transformation, it is a continuing reaction even though the heat level is lowered after drying. It is to be noted that ambient room temperature and time will also initiate and effect a lesser degree of continuing reaction. Upon exposure to light, hardening is greatly accelerated in the irradiated areas. Thus, the continuing reaction progresses in the areas of the screen discretely shadowed during exposure and is directly related to time span of exposure. If the exposure irradiation is of short duration, the amount of continuing hardening associated therewith is of a degree to cause a lesser amount of hardening of the phosphor-bearing resist material in the shadowed areas. Therefore, the sensitized material is more easily removed from the shadowed areas during the respective developing step of the screen forming procedure.

In this specification, the term "continuing hardening reaction" is used in the prior art way to refer to the hardening of the resist material that is initiated by dark reaction during the drying of the resist layer and which continues in the shadowed areas during screen exposure, i.e., a dark-initiated continuing reaction.

Phosphor body color is a major factor in determining the length of exposure for the formation of the respective color screen pattern. This important characteristic of cathodoluminescent phosphors relates to the degree of translucency or opacity of the particular color-emitting phosphor crystal. Those phosphors that are substantially translucent are conventionally classed as having a desirable white body color which enhances the transmission of the light therethrough during screen fabrication. The various color-emitting cathodoluminescent phosphors conventional to the art have representative body colors of differing degrees of translucency which, when utilized in screening, require a span of exposure commensurate thereto. When the resist has associated with it a blue phosphor such as zinc sulfide, having substantially a white body crystal, a relatively short time span of light irradiation is required to harden desired dot sized areas of the photosensitized layer and effect a depth of hardening to achieve adherence of the dots to the panel surface. A green phosphor, such as zinc cadmium sulfide, has a slightly yellowish body color because of the cadmium sulfide content; therefore, a somewhat longer time span of light irradiation is required to penetrate the phosphor and achieve the desired amount of hardening of the color dot field in the resist layer. Since the continuing reaction in the shadowed screen area, which was initiated during the drying of the sensitized resist layer, continues to progress during the time span of pattern exposure, a greater degree of hardening of the shadowed resist material is effected. This requires a longer developing step to remove the partially hardened material from the shadowed screen area. For example, the blue field may require a development period of almost four minutes while the green field may require approximately six.

Hardening of the resist associated with the deposition of a red phosphor, such as zinc cadmium sulfide, requires a still longer period of light exposure since these phosphor particles, being of a yellow-orange body color and having less translucency than the green because of a greater cadmium sulfide content, markedly slows down the penetration of the light irradiation and the resultant rate of resist hardening. Thus, to achieve the degree of hardening necessary for adequate red dot adherence, a much longer time span of light exposure is necessary than for the other color phosphors utilized in the screen compositions. While the apertures in the foraminous mask remain constant, the longer period of light irradiation tends to produce dots of sizes larger than desired. The ultraviolet irradiation defining the red dots becomes of sufficient duration to have a diffusive value, which, in conjunction with the continuing hardening reaction in the shadowed area, tends to extend the hardening of the red-associated resist material beyond the desired peripheries of the red dots into the edges of the previously disposed adjacent color dots thereby causing deleterious adherence of contaminating red phosphor particles thereto. This cross-contamination of red phosphor dilutes the fluorescent color purity of the adjacent greens and blues. In addition, this longer period of exposure irradiation prolongs the continuing hardening reaction in the shadowed resist area which aggravates adequate removal of the resist material. Thus, it is evidenced that the continuing reaction in the shadowed areas creates several aggravating problems from the viewpoint of both quality and manufacturing. In summary, these are manifest in the form of larger than desired color dot sizes, cross-contamination of color-emitting phosphors, the subjection of previously disposed portion of the screen to lengthy development periods, and the consequentially protracted fabrication time requirement.

In the prior methods of dusting screens occasional problems arose which deleteriously affected the finished tube. These problems manifested themselves as "pick-outs," i.e., areas where the phosphor did not adhere well to the screen and subsequently fell off leaving bare spots, and unequal light output caused by uneven distribution of the phosphor which resulted in varying thicknesses of the discrete elements.

The general object of this invention is to provide a method of fabricating screens for color television wherein dry phosphor particles are deposited uniformly in image-wise configuration on a faceplate reducing the aforementioned disadvantages. Another object of this invention is to provide a method of fabricating screens for color television wherein dry phosphor particles are deposited uniformly in image-wise configuration on a faceplate after the faceplate has been exposed to actinic radiation in image-wise configuration. Still another object of this invention is to provide a method of fabricating screens for color television tubes using a positive acting sensitizer. Other objects appear hereinafter.

In the description that follows, the phrase "powder-receptive, solid, light-sensitive organic layer" is used to describe an organic layer which is capable of developing a predetermined contrast or reflection density ($R_d$) upon exposure to actinic light and embedment of black powder particles of a predetermined size in a single stratum at the surface of said organic layer. While explained in greater detail below, the $R_d$ of a light-sensitive layer is a photometric measurement of the difference in degree of blackness of undeveloped areas and black powder developed areas. The terms "physically embedded" or "physical force" are used to indicate that the powder particle is subjected to an external force other than, or in addition to, either electrostatic force or gravitational force resulting from dusting or sprinkling powder particles on a substrate. The terms "mechanically embedded" or "mechanical force" are used to indicate that the powder particle is subjected to a manual or machine force, such as lateral to-and-fro or circular rubbing or scrubbing action. The term "embedded" is used to indicate that the powder particle displaces at least a portion of the light-sensitive layer and is held in the depression so created, i.e., at least a portion of each particle is below the surface of the light-sensitive layer.

The objects of this invention can be attained by coating a cathode ray tube faceplate with a solid, light-sensitive organic layer capable of developing a $R_d$ of 0.2 to 2.2, preferably a $R_{dp}$ of 0.4 to 2.2; exposing said light-sensitive organic layer to actinic radiation in image-receiving manner to establish a potential $R_d$ or 0.2 to 2.2; applying to said layer of organic material, free flowing phosphor particles having a diameter, along at least one axis of at least about 0.3 micron but less than 25 times the thickness of said organic layer; while the layer is at a temperature below the melting points of the phosphor powder and of the organic layer, physically embedding said phosphor particles as a monolayer in a stratum at the surface of said light-sensitive layer to yield an image having portions varying in density in proportion to the exposure of each portion; and removing non-embedded particles from said organic layer to develop a discrete phosphor pattern. The faceplate can be fired to volatilize the solid, light-sensitive organic layer simultaneously fusing the phosphor to the faceplate. The faceplate is then recoated with additional solid, light-sensitive organic layers with or without firing and reprocessed in the same manner to deposit phosphors of different colors in the proper configuration and/or to reinforce the first phosphor pattern with additional phosphors of the same color. After all the phosphors are deposited in image-wise configuration, the faceplate is fired to remove all of the organic material on the surface of the faceplate.

Since the phosphors in this invention are embedded into the light-sensitive layer after exposure, the present process has the obvious advantages that it requires much less phosphor to produce a cathode ray tube and the exposure time of each light-sensitive layer is independent of the phosphor body color of the phosphors employed, thereby resulting in more uniform phosphor dot size. Further, the preferred positive acting light-sensitive layers of this invention have the additional advantage that the so-called prior art "continuing hardening reaction" neither reduces the sharpness of phosphor dots nor causes any cross-contamination of phosphor dots. Instead, slight overexposure of the positive acting light-sensitive layers utilized in this invention sharpens up the phosphor dots and eliminates any possibility of cross-contamination.

The present invention provides a method of forming a phosphor deformation image wherein the deformation image is developed by embedding phosphor particles of predetermined size into a stratum at the surface of a powder-receptive solid, light-sensitive organic layer. This process makes use of the discovery that thin layers of many solid organic layers, some in substantially their naturally occurring or manufactured forms and others including additives to control their powder receptivity and/or sensitivity to actinic radiation, can have surface properties that can be varied with a critical range by exposure to actinic radiation between a particle-receptive condition and a particle-non-receptive condition. As explained below, the particle receptivity and particle non-receptivity of the solid thin layers are dependent on the size of the particles, the thickness of the solid thin layer and development conditions, such as layer temperature.

Broadly speaking, the present method of forming phosphor images differs from known methods in various subtle and unobvious ways. For example, the phosphor particles that form an image are not merely dusted on before exposing the light-sensitive layer to actinic radiation, but instead are applied against the surface of the light-sensitive organic layer under moderate physical force after exposing the light-sensitive layer to actinic radiation. The relatively soft or particle-receptive nature of the light-sensitive layer is such that substantially a monolayer of phosphor particles, or isolated small agglomerates of a predetermined size, are at least partially embedded at the surface of the light-sensitive layer by moderate physical force. The surface condition in the particle receptive area is at most only slightly soft but not fluid as in prior processes. The relatively hard or particle non-receptive condition of the light-sensitive surface in the non-image areas is such that when phosphor particles of a predetermined size are applied under the same moderate physical force few, if any, are embedded sufficiently to resist removal by moderate dislodging action such as blowing air against the surface. Any particles remaining in the non-image areas are removed readily by rubbing a soft pad over the surface. In this way, the developed images and subsequently processed screens are characterized by substantial freedom from pick-out and exhibit substantially equal brightness over the entire screen. Further, the process of this invention eliminates the previous wasteful application of phosphor to both image and non-image areas since the phosphors are only applied to the desired image areas.

For use in the invention, the solid, light-sensitive organic layer, which can be an organic material in its naturally occurring or manufactured form or a mixture of said organic material with plasticizers and/or photoactivators for adjusting the powder receptivity and sensitivity to actinic radiation, must be capable of developing a predetermined contrast or $R_d$ using a suitable black developing powder under the conditions of development. The powder-receptive areas of the layer (unexposed areas of a positive-acting, light-sensitive material or the exposed areas of a negative-acting, light-sensitive material) must have a softness such that suitable particles can be embedded into a stratum at the surface of the light-sensitive layer by mild physical forces. However, the layer should be sufficiently hard that film transparencies can be pressed against the surface without the surfaces sticking together or being damaged even when heated slightly under high intensity light radiation. The film should also have a degree of toughness so that it maintains its integrity during development. If the $R_d$ of the light-sensitive layer is below about 0.2, the light-sensitive layer is too hard to accept a suitable concentration of phosphor particles. On the other hand, if the $R_d$ is above about 2.2, the light-sensitive layer is so soft that it is difficult to maintain film integrity during physical development and the layer tends to adhere to transparencies precluding the use of vacuum frame or contact exposure equipment. Further, if the $R_d$ is above 2.2, the light-sensitive layer is so soft that more than one layer of phosphor particles may be deposited with attendant loss of image fidelity and the layer may be displaced by mechanical forces resulting in distortion or destruction of the image. Accordingly, for use in this invention the light-sensitive layer must be capable of developing a $R_d$ within the range of 0.2 to 2.2 or preferably 0.4 to 2.0, using a suitable black developing powder under the conditions of development.

The $R_d$ of a positive acting light-sensitive layer, which is called $R_{dp}$, is a photometric measurement of the reflection density of a black-powder developed light-sensitive layer after a positive-acting, light-sensitive layer has been exposed to sufficient actinic radiation to convert the exposed areas into a substantially powder-non-receptive state (clear the background). The $R_d$ of a negative acting light-sensitive layer, which is called $R_{dn}$, is a photometric measurement of the reflection density of a black powder developed area, after a negative-acting, light-sensitive layer has been exposed to sufficient actinic radiation to convert the exposed area into a powder-receptive area.

In somewhat greater detail, the reflection density of a solid, positive-acting, light-sensitive layer ($R_{dp}$) is determined by coating the light-sensitive layer on a white substrate, exposing the light-sensitive layer to sufficient actinic radiation image-wise to clear the background of the solid positive-acting light-sensitive layer, applying a black powder (prepared from 77 percent Pliolite VTL and 23 percent Neo Spectra carbon black in the manner described below) to the exposed layer, physically embedding said black powder under the conditions of development as a monolayer in a stratum at the surface of said light-sensitive layer and removing the non-embedded particles from said light-sensitive layer. The developed organic layer containing black powder embedded image areas and substantially powder free non-image areas is placed in a standard photometer having a scale reading from 0 to 100 percent reflection of incident light or an equivalent density scale, such as on Model 500 A photometer of the Photovolt Corporation. The instrument is zeroed (0 density; 100 percent reflectance) on a powder free non-image area of the light-sensitive organic layer and an average $R_d$ reading is determined from the powder developed area. The reflection density is a measure of the degree of blackness of the developed surface which is relatable to the concentration of particles per unit area. The reflection density of a solid, negative-acting light-sensitive layer ($R_{dn}$) is determined in the same manner except that the negative-acting light-sensitive layer is exposed to sufficient actinic radiation to convert the exposed area into a powder receptive area. If the $R_d$ under the conditions of development is between 0.2 (63.1 percent reflectance) and 2.2 (0.63 percent reflectance), or preferably between 0.4 (39.8 percent reflectance) and 2.0 (1.0 percent reflectance), the solid, light-sensitive organic material deposited in a layer is suitable for use in this invention.

Although the $R_d$ of all light-sensitive layers is determined by using the aforesaid black developing powder and a white substrate, the $R_d$ is only a measure of the suitability of a light-sensitive layer for use in this invention.

Since the $R_d$ of any light-sensitive layer is dependent on numerous factors other than the chemical constitution of the light-sensitive layer, the light-sensitive layer is best defined in terms of its $R_d$ under the development conditions of intended use. The positive-acting, solid, light-sensitive organic layers useful in this invention must be powder receptive in the sense that the aforesaid black developing powder can be embedded as a monoparticle layer into a stratum at the surface of the unexposed layer to yield a $R_{dp}$ of 0.2 to 2.2 (0.4 to 2.0 preferably) under the predetermined conditions of development and light-sensitive in the sense that upon exposure to actinic radiation the most exposed areas can be converted into the non-particle receptive state (background cleared) under the predetermined conditions of development. In other words, the positive-acting, light-sensitive layer must contain a certain inherent powder receptivity and light-sensitivity. The positive-acting, light-sensitive layers are apparently converted into the powder-non-receptive state by a light-catalyzed hardening action, such as photopolymerization, photocrosslinking, photooxidation, etc. Some of these photohardening reactions are dependent on the presence of oxygen, such as the photooxidation of internally ethylenically unsaturated acids and esters while others are inhibited by the presence of oxygen, such as those based on the photopolymerization of vinylidene or polyvinylidene monomers along or together with polymeric materials. The latter requires special precautions, such as storage in oxygen-free atmosphere or oxygen-impermeable cover sheets. For this reason, it is preferable to use solid, positive-acting, film-forming, organic materials containing no terminal ethylenic unsaturation. As indicated above, the positive-acting, solid, light-sensitive organic layers are preferred since the so-called prior art "continuing hardening reaction" neither reduces the sharpness of phosphor dots nor causes any cross-contamination of phosphor dots.

The negative-acting, solid light-sensitive organic layers useful in this invention must be light-sensitive in the sense that, upon exposure to actinic radiation, the most exposed areas of the light-sensitive layer are converted from a non-powder-receptive state under the predetermined conditions of development to a powder-receptive state under the predetermined conditions of development. In other words, the negative-acting light-sensitive layer must have a certain minimum light-sensitivity and potential powder receptivity. The negative-acting light-sensitive layers are apparently converted into the powder receptive state by a light-catalyzed softening action, such as photodepolymerization.

In general, the positive-acting, solid, light-sensitive layers useful in this invention comprise a film-forming organic material in its naturally occurring or manufactured form or a mixture of said organic material with plasticizers and/or photoactivators for adjusting powder receptivity and sensitivity to actinic radiation. Suitable positive-acting, film-forming organic materials, which are not inhibited by oxygen, include internally ethylenically unsaturated acids, such as abietic acid, rosin acids, partially hydrogenated rosin acids, such as those sold under the name Staybelite resin, wood rosin, etc., esters of internally ethylenically unsaturated acids, methylol amides of maleated oils such as described in application Ser. No. 643,367 filed June 5, 1967, U.S. Pat. No. 3471466 phosphatides of the class described in aplication Ser. No. 796,841 filed on Feb. 5, 1969 U.S. Pat. No. 3585031 in the name of Hayes, such as soybean lecithin, partially hydrogenated lecithin, dilinolenyl-alpha-lecithin, etc., partially hydrogenated rosin acid esters, such as those sold under the name Staybelite esters, rosin modified alkyds, etc.; polymers of ethylenically unsaturated monomers, such as vinyltoluene-alpha methyl styrene copolymers, polyvinyl cinnamate, polyethyl methacrylate, vinyl acetate-vinyl stearate copolymers, polyvinyl pyrrolidone, etc.; coal tar resins, such as coumarone-indene resins, etc.; halogenated hydrocarbons, such as chlorinated waxes, chlorinated polyethylene, etc. Positive acting, light-sensitive materials, which are inhibited by oxygen include mixtures of polymers, such as polyethylene terephthalate/sebacate, or cellulose acetate or acetate/-butyrate, with polyunsaturated vinylidene monomers, such as ethylene glycol diacrylate or dimethacrylate, tetraethylene glycol diacrylate or dimethacrylate, etc.

Although numerous positive-acting, film-forming organic materials have the requisite light-sensitivity and powder receptivity at predetermined development temperatures, it is generally preferable to compound the film-forming organic material with photoactivator(s) and/or plasticizer(s) to impart optimum powder receptivity and light-sensitivity to the light-sensitive layer. In most cases, the light-sensitivity of an element can be increased many fold by incorporation of a suitable photoactivator capable of producing free-radicals, which catalyze the light-sensitive reaction and reduce the amount of photons necessary to yield the desired physical change.

Suitable photoactivators capable of producing free-radicals include benzil, benzoin, Michlers ketone, diacetyl, phenanthraquinone, p-dimethylaminobenzoin, 7,8-benzoflavone, trinitrofluorenone, desoxy-benzoin, 2,3-pentanedione, dibenzylketone, nitroisatin, di(6-dimethylamino-3-pyradil)methane, metal napthanates, N-methyl-N-phenylbenzylamine, pyridil, 5-7 dichloroisatin, azodiisobutyronitrile, trinitroanisole, chlorophyll, isatin, bromoisatin, etc. These compounds can be used in a concentration of .001 to 2 times the weight of the film-forming organic material (.1–200 percent the weight of film former). As in most catalytic systems, the best photo-activator and optimum concentration thereof is dependent upon the film-forming organic material. Some photoactivators respond better with one type of film former and may be useful over rather narrow concentration ranges whereas others are useful with substantially all film-formers in wide concentration ranges.

The acyloin and vicinal diketone photoactivators, particularly benzil and benzoin, are preferred. Benzoin and benzil are effective over wide concentration ranges with substantially all film-forming light-sensitive organic materials. Benzoin and benzil have the additional advantage that they have a plasticizing or softening effect on film-forming light-sensitive layers, thereby increasing the powder receptivity of the light-sensitive layers. When employed as a photoactivator, benzil should preferably comprise at least 1 percent by weight of the film-forming organic material (.01 times the film former weight).

Dyes, optical brighteners and light absorbers can be used alone or preferably in conjunction with the aforesaid free-radical producing photoactivators (primary photoactivators) to increase the light-sensitivity of the light-sensitive layers of this invention by converting light rays into light rays of longer lengths. For convenience, these secondary photoactivators (dyes,optical brighteners and light absorbers) are called "superphotoactivators." Suitable dyes, optical brighteners and light absorbers include 4-methyl-7-dimethylaminocoumarin, Calcofluor yellow HEB (preparation described in U. S. Pat. No. 2,415,373), Calcofluor white SB super 30080, Calcofluor, Uvitex W conc., Uvitex TXS conc., Uvitex RD (described in Textil-Rundschau 8 [1953], 339), Uvitex WGS conc., Uvitex K, Uvitex CF conc., Uvitex W (described in Textil-Rundschau 8, [1953], 340), Aclarat 8678, Clancophor OS, Tenopol UNPL, MDAC S-8844, Uvinul 400, Thilflavin TGN conc.,Aniline yellow - S (low conc.), Seto flavine T 5506-140, Auramine 0, Calcozine yellow OX, Calcofluor RW, Calcofluor GAC, Acetosol yellow 2 RLS-PHF, Eozine bluish, Chinoline yellow-P conc., Ceniline yellow S (high conc.), Anthracene blue Violet fluorescence, Calcofluor white MR, Tenopol PCR, Uvitex GS, Acid-yellow-T-supra, Acetosol yellow 5 GLS, Calcocid OR. Y. Ex. Conc., diphenyl brilliant flavine 7 GFF, Resoflorm fluorescent yellow 3 GPI, Eosin yellowish, Thiazole fluorescor G, Pyrazalone organe YB-3, and National FD&C yellow. Individual superphotoactivators may respond better with one type of light-sensitive organic film-former and photoactivator than with others. Further, some photoactivators function better with certain classes of brighteners, dyes and light absorbers. For the most part, the most advantageous combinations of these materials and proportions can be determined by simple experimentation.

As indicated above, plasticizers can be used to impart optimum powder receptivity to the light-sensitive layer. With the exception of lecithin, most of the film-forming light-sensitive organic materials useful in this invention are not powder-receptive at room temperature but are powder-receptive above room temperature. Accordingly, it is desirable to add sufficient plasticizer to impart room temperature (15° to 30° C.) or ambient temperature powder receptivity to the light-sensitive layers and/or broaden the $R_{dp}$ range of the light-sensitive layers.

While various softening agents, such as dimethyl siloxanes, dimethyl phthalate, glycerol, vegetable oils, etc. can be used as plasticizers, benzil and benzoin are preferred since, as pointed out above, these materials have the additional advantage that they increase the light-sensitivity of the film forming organic materials. As plasticizer-photoactivators, benzoin and benzil are preferably used in a concentration of 1 to 80 percent by weight of the film-forming solid organic material.

The preferred positive-acting light-sensitive film formers containing no conjugated terminal ethylenic unsaturation include the esters and acids of internally ethylenically unsaturated acids, particularly the phosphatides, rosin acids, partially hydrogenated rosin acids and the partially hydrogenated rosin esters. These materials, when compounded with suitable photoactivators, preferably acyloins or vicinal diketones together with superphotoactivators, require less than 2 minutes exposure to clear the background of light-sensitive layers and can be developed to yield phosphor patterns having the desired configuration.

In general, the negative-acting light-sensitive layers useful in this invention comprise a film forming organic material in its naturally occurring or manufactured form, or a mixture of said organic material with plasticizers and/or photoactivators for adjusting powder receptivity and sensitivity to actinic radiation. Suitable negative acting film-forming organic materials include n-benzyl linoleamide, dilinoleyl-alpha-lecithin, castor wax (glycerol 12-hydroxy-stearate); ethylene glycol monohydroxy stearate, polyisobutylene, polyvinyl stearate, etc. Of these, castor wax and other hydrogenated ricinoleic acid esters (hydroxystearate) are preferred. These materials can be compounded with plasticizers and/or photoactivators in the same manner as the positive acting light-sensitive film-forming organic materials.

Some solid light-sensitive organic film formers can be used to prepare either positive or negative acting light-sensitive layers. For example, a poly(n-butyl methacrylate) layer containing 20 percent benzoin (20 parts by weight benzoin per 100 parts by weight polymer) yields good positive-acting images. Increasing the benzoin level to 100 percent converts the poly(n-butyl methacrylate) layer into a good negative-acting system.

In somewhat greater detail, the support upon which the screen is to be laid, and which preferably is the inner or concave surface of a cathode ray tube faceplate, is first thoroughly cleaned. The cleaning may be accomplished by successive rinses of alcohol followed by rinses of distilled or deionized water. Rinses with a mildly alkaline solution followed by a rinse with a weak acidic solution are also effective; however, thorough rinsing with distilled or deionized water should follow any of the above procedures. If any acid bath containing halogen ions is utilized, the rinsing should be sufficient to insure removal thereof since these extremely reactive ions tend to poison the subsequently applied phosphor.

The solid, light-sensitive film forming organic layer capable of developing a $R_{dp}$ or $R_{dn}$ of 0.2 to 2.2 can be applied to the faceplate by spraying, whirler coating from solvent solution, coating the faceplate with solvent solution, etc. The light-sensitive material is preferably applied by spraying upwardly to the support and the coating is built up gradually by successive passes of spray rather than singly. The multiple spraying allows a more uniform coating to be applied. Unlike other processes, which are dependent upon maintaining a certain level of tackiness, the coating operation can be performed at almost any temperature and humidity.

The light-sensitive layer must be at least 0.1 micron thick, and preferably at least 0.4 micron, in order to hold phosphor powders during development. If the light-sensitive layer is less than 0.1 micron, or the phosphor powder diameter is more than 25 times layer thickness, the light-sensitive layer does not hold the phosphor with the necessary tenacity. In general, as layer thickness increases, the light-sensitive layer is capable of holding larger phosphor particles. However, as the light-sensitive layer thickness increases, it becomes increasingly difficult to maintain film integrity during development. Accordingly, the light-sensitive layer must be from 0.1 to 40 microns, preferably from 0.4 to 10 microns.

The light-sensitive layers of predetermined thickness are preferably applied to the faceplate from an organic solvent (hydrocarbon, such as hexane, heptane, benzene, etc.; halogenated hydrocarbon, such as chloroform, carbon tetrachloride, 1,1,1-trichloroethane, trichloroethylene, etc.). In general, hydrocarbons are preferred in order to eliminate the possibility of halide ion contamination of phosphor. The thickness of the light-sensitive layer can be varied as a function of the concentration of the solids dissolved in the solvent.

After the faceplate is coated with a suitable solid, light-sensitive organic layer, a latent image is formed by exposing the element to actinic radiation in image receiving manner for a time sufficient to provide a potential $R_d$ of 0.2 to 2.2 (clear the background of the positive-acting, light-sensitive layers or establish a potential $R_{dn}$ of 0.2 to 2.2 with negative-acting, light-sensitive layers). The light-sensitive elements can be exposed to actinic light through a photographic positive or negative.

As indicated, the latent images are produced from positive-acting, light-sensitive layers by exposing the element in image-receiving manner for a time sufficient to clear the background, i.e., render the exposed areas non-powder receptive. To some extent, the amount of actinic radiation necessary to clear the background varies with developer powder size and development conditions. Due to thses variations, it is often desirable to slightly overexpose to assure complete clearing of the background, to sharpen up the phosphor dot size and prevent phosphor dot contamination. In general, overexposure is preferred with negative-acting, light-sensitive elements in order to provide maximum contrast.

After the light-sensitive element is exposed to actinic radiation for a time sufficient to clear the background of a positive-acting light-sensitive layer or establish a potential $R_{dn}$ of 0.2 to 2.2, a phosphor powder having a diameter or dimension along the axis of at least 0.3 micron is applied physically with a suitable force, preferably mechanically, to embed the phosphor in the light-sensitive layer. The phosphor developing powder can be virtually any shape, such as spherical, acicular, platelets, etc., provided it has a diameter along at least one axis of at least 0.3 micron.

The phosphor powders can be applied in a substantially pure form or on a suitable carrier. Carriers, such as resinous polymeric materials, can be employed to regulate the particle size of the phosphor and/or to apply more phosphor in each development step. The phosphor can be ball-milled with polymeric carrier in order to coat the carrier with phosphor, or, if desired, the phosphor can be blended above the melting point of a resinous carrier, ground to a suitable size and classified.

The phosphor particles may be formed from a number of conventional color-emitting phosphors including sulfides, oxides, tungstates, aluminates, borates, selenides or silicates of one or more metals including zinc, cadmium beryllium, magnesium, manganese, calcium, strontium, etc. These materials may be activated by metals, such as silver, copper, manganese, etc.

The black developing powder for determining the $R_d$ of a light-sensitive layer is formed by heating about 77 percent Pliolite VTL (vinyltoluene-butadiene copolymer) and 23 percent Neo Spectra carbon black at a temperature above the melting point of the resinuous carrier, blending on a rubber mill for fifteen minutes and then grinding in a Mikro-atmomizer.

The phosphor powders useful in this invention contain particles having a diameter or dimension along at least one axis from 0.3 to 40 microns, preferably from 0.5 to 10 microns, with powders of the order of 1 to 15 microns being best for light-sensitive layers of 0.4 to 10 microns. Maximum particle size is dependent on the thickness of light-sensitive layer while minimum particle size is independent of layer thickness. Electron microscope studies have shown that powders having a diameter 25 times the thickness of the light-sensitive layer cannot be permanently embedded into light-sensitive layers and, generally speaking, best results are obtained where the diameter of the powder particle is less than about 10 times the thickness of the light-sensitive layer. For the most part, phosphor particles over 40 microns are not detrimental to image development provided the developing powder contains a reasonable concentration of powder particles under 40 microns, which are less than 25 times, and preferably less than 10 times, the light-sensitive layer thickness.

Although phosphor particles over 40 microns are not detrimental to image development, the presence of particles under 0.3 micron diameter along all axes can be detrimental. In general, it is preferable to employ phosphor developing powders having substantially all powders having a diameter along at least one axis not less than 0.3 micron, preferably more than 0.5 micron, since particles less than 0.3 micron tend to embed in non-image areas. As the particle size of the smallest phosphor powder in the developer increases, less exposure to actinic radiation is required to clear the background.

For best results, the phosphor developing powder should have substantially all particles (at least 95 percent by weight) over 1 micron in diameter along the axis and preferably from 1 to 15 microns for use with light-sensitive layers of from 0.4 to 10 microns. In this way, powder embedment in image areas is maximum.

In somewhat greater detail, the phosphor developing powder is applied directly to the light-sensitive layer, while the powder receptive areas of said layers are in at most only a slightly soft condition and said layer is at a temperature below the melting point of the layer and powder. The powder is distributed over the area to be developed and physically embedded into the stratum at the surface of the light-sensitive layer, preferably mechanically by force having a lateral component, such as to-and-fro and/or circular rubbing or scrubbing action using a soft pad, fine brush or even an inflated balloon. If desired, the powder may be applied separately or contained in the pad or brush. The quantity of powder is not critical provided there is an excess available beyond that required for full development of the area, as the development seems to depend primarily on particle-to-particle interaction rather than brush-to-surface or pad-to-surface forces to embed a layer of powder particles substantially one particle thick (monoparticle layer) into a stratum at the surface of the light-sensitive layer. Only a single stratum of powder particles penetrates into the powder-receptive areas of the light-sensitive layer even if the light-sensitive layer is several times thicker than the developer particle diameter.

The pad or brush used for development is critical only to the extent that it should not be so stiff as to scratch or scar the film surface face when used with moderate pressure with the preferred amount of powder to develop the film. Ordinary absorbent cutton loosely compressed into a pad about the size of a baseball and weighing about 3 to 6 grams is especially suitable. The developing motion and force applied to the pad during development is not critical. The speed of the swabbing action is not critical other than that it affects the time required; rapid movement requiring less time than slow. The preferred mechanical action involved is essentially the lateral action applied in ultrafine finishing of a wood surface by hand sanding or steel wooling.

Hand swabbing is entirely satisfactory, and when performed under the conditions described above, will reproducibly produce the maximum density which the material is capable of achieving. That is, the maximum concentration of particles per unit area will be deposited under the prescribed conditions, dependent upon the physical properties of the material such as softness, resiliency, plasticity, and cohesivity. Substantially the same results can be achieved using a mechanical device for the powder application. A rotating or rotating and oscillating, cylindrical brush or pad may be used to provide the described brushing action and will produce a substantially similar end result.

After the phosphor application, excess phosphor remains on the surface which has not been sufficiently embedded into, or attached to, the faceplate. This may be removed in any convenient way, as by wiping with a clean pad or brush usually using somewhat more force than employed in mechanical development, by vacuuming, by vibrating, or by air doctoring and recovered. For simplicity and uniformity of results, the excess powder usually is blown off using an air gun have an air-line pressure of about 20 to 40 psi. The gun is preferably held at an angle of about 30 to 60 degrees to the surface at a distance of 1 to 12 inches (3 to 8 preferred). The pressure at which the air impinges on the surface is about 0.1 to 3, and preferably about 0.25 to 2, pounds per square inch. Air cleaning may be applied for several seconds or more until no additional loosely held particles are removed. The remaining powder should be sufficiently adherent to resist removal by moderately forceful wiping or other reasonably abrasive action.

The faceplate bearing a first phosphor in image-wise configuration is then coated with a second solid, light-sensitive organic layer while maintaining the first phosphor in its image-wise configuration and reprocessed in the same manner to deposit phosphors of different colors and/or reinforce the first phosphor pattern with additional phosphor of the same color. The above operations are repeated as many times as necessary, usually three times to deposit three different phosphors for the common tube in use today. After all the phosphors are deposited in image-wise configuration, the faceplate is fired (either before or after assembling the tube) to remove all the organic material on the surface of the faceplate and fuse any unfused phosphors to the surface of the faceplate. For the purpose of this invention, it is essential that each solid, light-sensitive organic layer to deposited on the faceplate bearing the first phosphor or phosphors without destroying the image-wise configuration of the previously deposited phosphors.

Numerous techniques can be employed to deposit one or more solid, light-sensitive organic layers on an imaged faceplate while maintaining the first phosphor or phosphors in image-wise configuration. Some of these techniques, such as those where the light-sensitive organic material is deposited from a liquid vehicle, are limited to some extent by the solubility characteristics of the light-sensitive organic layer. For example, phosphor image fidelity may be lost if the faceplate bearing a first solid, light-sensitive organic layer holding a monolayer of phosphor particles is flow coated with a second light-sensitive layer from a vehicle, which is a good solvent for the first light-sensitive layer. This problem can be minimized or overcome in a number of ways, as explained with reference to colorants in our parent application Ser. Nos. 849,493 and 849,492, which are hereby incorporated by reference. For example, phosphor image fidelity generally remains good, when the second or subsequent light-sensitive organic layer or layers are deposited from a vehicle, which is a good solvent for the light-sensitive organic layer or layers holding the phosphor or phosphors, by spraying upwardly to the faceplate. If desired, a dry light-sensitive layer can be deposited from an aerosol held at a sufficient distance from the faceplate to permit substantially all of the propellant to evaporate before the solid organic layer deposits on the faceplate. On the other hand, the second or subsequent solid, light-sensitive organic layers can be deposited on the faceplate bearing the first phosphor or phosphors without destroying the image-wise configuration of the first phosphor or phosphors if the subsequent light-sensitive organic layers are deposited from a vehicle, which is a relatively poor solvent for the previously depositied solid, light-sensitive organic layers.

Numerous techniques can be employed to alter the solubility characterisitics of the solid, light-sensitive organic layer holding the phosphor particles in image-wise configuration and/or to alter the adhesion of the phosphor particles to the faceplate. For example, various polyfunctional compounds known to interact with the solid, light-sensitive organic layer can be applied to the phosphor image layer and reacted prior to the application of the second light-sensitive organic layer. Suitable polyfunctional compounds include polyvalent metal salts, dimethylol urea, urea formaldehyde resins, melamine formaldehyde resins, etc. In some cases, it may be desirable to treat the first image with diethylenically unsaturated polymerization vinylidene monomers or dichromate and tan the layer to an infusible form with actinic radiation. In some cases, the solubility characteristics of the originally light-sensitive layer may be altered after development by uniform light exposure. For example, the unexposed portions of solid, light-sensitive organic layers comprising a thermoplastic polymer and diethylenically unsaturated polymerizable vinylidene monomer can be converted into a thermoset state by uniform actinic radiation.

In some cases, it is advantageous to overcoat the phosphor imaged layer with an isolating layer to alter the solubility characteristics of the surface of the substrate upon which the second light-sensitive layer is deposited. For example, when employing a hydrocarbon-soluble, water-insoluble, light-sensitive organic material in both the first and second layers, a hydrophilic layer, such as polyvinyl alcohol, can be deposited as an isolating layer between the two light-sensitive layers. If desired, the isolating layer can be tanned to an infusible state by employing a dichromated colloid, such as dichromated polyvinyl alcohol or gelatin, and exposing the layer to uniform actinic radiation tanning the isolating layer.

In other cases, it may be desirable to fuse the phosphor particles into the surface of the faceplate. For example, when employing a hydrocarbon soluble, water-insoluble light-sensitive organic material in both the first and second layer, a hydrophilic carrier for the phosphor particles, such as polyvinyl alcohol, corn starch, rice starch, etc., can be fused to the surface of the faceplate with water vapor thereby fusing the phosphor particles to the facplate. A particularly preferred method entails firing each deposited phosphor pattern prior to the application of a new light-sensitive organic layer. The firing removes all the organic material from the surface of the faceplate and fuses the phosphor particles to the faceplate in proper image-wise configuration rendering the phosphor pattern impervious to the effects of vehicles used for depositing the light-sensitive organic layers.

While this invention is directed primarily to the preparation of screen for color television tubes, the present invention can be used for the preparation of ceramic articles, such as black and white television tubes, pottery bearing various designs, etc. In this modification of our process, a suitable ceramic material bearing a solid, light-sensitive organic layer having a $R_d$ of 0.2 to 2.2, preferably 0.4 to 2.0, is exposed to actinic radiation in image-receiving manner to establish a potential $R_d$ of 0.2 to 2.2; free flowing powder particles of a fusible pigment having a diameter along at least one axis of at least 0.3 micron but less than 25 times the thickness of the organic layer, are applied to said organic layer; while the layer is at a temperature below the melting points of the powder and of the organic layer, the powder particles are physically embedded as a monolayer in a stratum at the surface of the layer to yield an image having portions varying in density in proportion to the exposure of each portion; non-embedded particles are removed from said organic layer and the ceramic article is fired to fuse the pigment to the acticle. In this process, a single pigment can be applied to the ceramic article and fired or two or more pigments may be applied to the ceramic article with firing being performed after each application of pigment or after the deposit of all the pigments.

In those cases where the fusible pigment comprises a conductive metal, such as copper, silver, gold, palladium, aluminum, etc., or conductive metal and organic carrier, the resultant fired element can be used as a ceramic printed circuit board suitable for use in computer equipment. Such elements are particularly useful in computers due to their resistance to heat build up in the computer. If desired, several distinct conductive printed circuits may be applied to the same ceramic printed circuit board. In such case, it is necessary to apply a passivating layer such as a vacuum deposited silicone monoxide or an alkali metal silicate solution. If desired, the conductive material may be partially or completely fused prior to firing and passed through a roll surface to assure that the printed circuit has a continuous conductive circuit.

In general, any of the techniques described above, with reference to the preparation of color television tubes can be employed. Further, the ceramic articles can be exposed to line, half-tone or continuous tone negatives or positives to produce excellent line, continuous tone and half-tone images. As explained in our parent application Ser. No. 796,897, filed Feb. 5, 1969, which is hereby incorporated by reference, deformation imaging can be employed advantageously to form line, half-tone and continuous tone images.

The following examples are merely illustrative and should not be construed as limiting the scope of our invention.

EXAMPLE 1

One and one-quarter grams Staybelite Ester No. 10 (partially hydrogenated rosin acid ester of glycerol) and 0.25 gram benzil, dissolved in 100 ml. hexane is applied to the concave surface of a cleaned faceplate by spraying upwardly to the faceplate forming a 2 micron thick light-sensitive layer. An appropriately pattern positive transparency, capable of producing the desired array of bars, stripes or dots, in this instance dots, is then positioned above the faceplate and the faceplate is exposed through the positive to light rays emitting from a carbon arc for about three minutes. The faceplate is developed in a room maintained at 75°F. at 50 percent relative humidity by rubbing a cotton pad bearing green phosphor (silver activated zinc cadmium sulfite) particles of from about 1 to 40 microns diameter along the largest axis across the faceplate. The green phosphor is embedded in the unexposed areas of the light-sensitive layer by rubbing the cotton pad back and forth over the light-sensitive layer using the same force employed in ultrafine finishing of wood surfaces. Excess phosphor is removed from the light-sensitive layer by impinging air at an angle of about 30° to the surface until the surface is substantially free of phosphor particles. The faceplate is then wiped with a fresh cotton pad resulting in a faithful reproduction of the phosphor dot pattern on the faceplate. The phosphor particles are fused to the faceplate and the light-sensitive organic layer volatilized by firing the faceplate.

The faceplate is resensitized with the Staybelite ester sensitizing solution used to prepare the first phosphor pattern. An appropriately pattern positive transparency is then positioned relative to the faceplate in a second position and exposed to the positive to light rays emitting from a carbon arc for about three minutes. The faceplate is developed using a blue phosphor (silver activated zinc sulfide) having particles of from about 1 to 40 microns along the largest axis in the manner described in the preceding paragraph. After embedding the blue phosphor into the unexposed areas of the light-sensitive layer, excess phosphor is removed and the faceplate fired.

The process is repeated a third time to embed a red-emitting phosphor (silver activated zinc cadmium sulfide) having particles of from 1 to 40 microns along the largest axis. After embedding the red phosphor and removing non-embedded phosphor from the faceplate, the faceplate is again fired forming a screen having innumerable triads of gree, blue and red color fluorescing dots, each dot being perfectly round and of the same size.

EXAMPLE 2

Example 1 is repeated with essentially the same results except that the Staybelite Ester No. 10 sensitizer is replaced with a sensitizer containing 5 grams of the ethanol insoluble fraction of soybean lecithin and 0.2 gram benzil dissolved in 100 ml. hexane and the exposure time reduced to 60 seconds.

EXAMPLE 3

Example 1 is repeated with essentially the same results except that the faceplate is fired only after the development of the third phosphor pattern and the first and second phosphor patterns are sprayed with a 5 percent aqueous solution of polyvinyl alcohol and dried to form a hydrophilic polyvinyl alcohol isolating layer.

EXAMPLE 4

Example 3 is repeated with essentially the same results except that the polyvinyl alchohol isolating layers are replaced with dichromated polyvinyl alcohol layers and the polyvinyl alcohol layers are tanned by uniform exposure of the whole layer to ultraviolet light.

EXAMPLE 5

Example 1 is repeated with essentially the same results except that the faceplate is fired only after the embedment of the third phosphor.

EXAMPLE 6

Example 1 is repeated with essentially the same results except that the Staybelite Ester No. 10 sensitizer is replaced with a sensitizer solution containing .64 gram of Staybelite Ester No. 10 and .16 gram benzil, dissolved in 100 ml. hexane.

EXAMPLE 7

Example 1 is repeated with essentially the same results replacing the Staybelite Ester No. 10 component of the sensitizer with an equal weight concentration of (1) abietic acid, (2) Staybelite resin (partially hydrogenated rosin acids) and (3) Staybelite Ester 5 (partially hydrogenated rosin ester of glycerol).

EXAMPLE 8

Example 1 is repeated with essentially the same results except that each exposure to actinic radiation is carried out using an electron beam after assembling the faceplate in a properly evacuated tube.

EXAMPLE 9

This example illustrates the use of a negative-acting light-sensitive coating to fabricate the faceplate of a cathode ray tube. Example 1 is repeated except that the Staybelite Ester No. 10 coating solution is replaced with a solution consisting of 1.5 gram Paracin 15 (ethylene glycol monohydroxy stearate), 0.2 gram benzil and 0.2 gram 4-methyl-7-dimethyl-aminocoumarin in 100 mls, 1,1,1-trichloroethane and a shadow mask is employed instead of a positive transparency.

EXAMPLE 10

This example illustrates the preparation of a three color ceramic hot plate. Ninety-six-hundredths of a gram of Staybelite Ester No. 10, .24 gram benzil and .144 gram 4-methyl-7-dimethylaminocoumarin dissolved in 100 ml. chlorothene was applied to a glazed ¼ inch thick, 6 inches square ceramic tile by flow coating the solution over the plate supported at about a 60° angle with the horizontal. After air drying for approximately one minute, the light-sensitive element was placed in a vacuum frame in contact with a cyan separation positive transparency of the reproduction to be copied and exposed to a mercury point light source for about 60 seconds. The light-sensitive element was removed from the vacuum frame and developed by rubbing a cotton pad containing Blue Overglaze No. 6341 of B.F. Drakenfeld and Company, across the element. The blue overglaze was embedded into the unexposed areas of the light-sensitive layer and excess overglaze was removed by impinging air at an angle of about 30° to the surface until the surface was substantially free of particles. The reproduction was wiped with a fresh cotton pad resulting in a faithful reproduction of the positive transparency. The blue overglaze was fused to the ceramic tile at 1,800°F, in a muffle furnace for one hour, removed from the furnace and permitted to cool.

After the imaged ceramic tile cooled to room temperature, it was flow coated with the same sensitizer solution used to prepare the blue overglaze, air dried, placed in register with the yellow separation positive, exposed to light in the manner described above, developed with Yellow Overglaze No. 6286 of B.F. Drakenfeld and Company and fused to the ceramic tile as described in the preceding paragraph.

After the imaged ceramic tile cooled to room temperature, it was coated with the same sensitizer solution used to produce the blue and yellow overglazes, air dried, placed in register with the magenta separation positive, exposed to light, developed with Blood Red Overglaze No. 6344 of B.F. Drakenfeld and Company and fired at 1,800°F. for one hour in the muffle furnace. The glazed tile was an accurate reproduction of the reproduction from which the separation transparencies had been made.

Essentially the same results are obtained by omitting the first two firing steps and applying a wash coat of about 5 percent aqueous polyvinyl alcohol to the developed overglaze prior to the application of fresh sensitizer solution.

EXAMPLE 11

A monochrome glazed ceramic hot plate was prepared in the manner described in Example 10 using the Blood Red No. 6344 Overglaze except that the image was fired at 1000°F, in a muffle furnace. After one hour at 1000°F. the muffle furnace was disconnected and the tile, which was left in the muffle furnace, was permitted to cool slowly, yielding an excellent monochrome image.

EXAMPLE 12

This example illustrates the preparation of 144 ceramic circuits at the same time. A twelve inch by twelve inch ceramic tile, having prescribed one inch by one inch breakout lines, is sensitized with the sensitizer described in Example 10, exposed to UV radiation for 60 seconds in a vacuum frame through a master having 144 one inch printed circuit patterns, developed with 5 to 10 micron copper powder in the manner described in Example 10 to embed the copper powder into non-exposed areas corresponding to the circuit patterns, placed in a furnace having a nitrogen atmosphere at 1200°C. to fuse the copper powders into continuous conductive circuits, removed from the oven and cooled.

A second circuit pattern can be applied to the copper image side of the ceramic plate in the same manner after passivating the copper circuit. The second copper circuit is produced by vacuum depositing silicone monoxide onto the copper image side and repeating the steps described in the preceding paragraph using a second master. This process may be repeated to apply virtually any number of circuit patterns on the same ceramic base. After the last circuit pattern is produced, the individual ceramic circuit board may be obtained by breaking the ceramic tile into one inch by one inch squares along the prescribed breakout lines.

Essentially the same results are obtained using (*a*) gold powders and a firing temperature of 1200°C. or (*b*) palladium powders and a firing temperature of 1700°C.

Since many embodiments of this invention may be made and since many changes may be made in the embodiments described, the foregoing is to be interpreted as illustrative only and our invention is defined by the claims appended hereafter.

What is claimed is:

1. The method of fabricating upon the concave surface of a faceplate of a cathode ray tube a screen bearing sets of discrete elements of at least two different colored light emitting phosphors affixed thereon which comprise:

1. exposing to actinic radiation in image-receiving manner an element comprising a faceplate bearing a first solid, light-sensitive organic layer capable of developing a $R_d$ of 0.2 to 2.2;
2. continuing the exposure to establish a potential $R_d$ of 0.2 to 2.2;
3. applying to said first layer of organic material, free flowing phosphor particles of a first color having a diameter along at least one axis of at least about 0.3 micron but less than 25 times the thickness of said first organic layer;
4. while the element is at a temperature below the melting points of the phosphor particles and of the first organic layer, embedding said phosphor particles as a monolayer in a stratum at the surface of said first organic layer to yield an image having portions varying in density in proportion to the exposure of each portion;
5. removing non-embedded phosphor particles from said first organic layer to develop a phosphor pattern;
6. coating said element with a second solid, light-sensitive organic layer having a thickness of at least 0.1 micron while maintaining said first phosphor pattern in its image-wise configuration, said second light-sensitive organic layer being capable of developing a $R_d$ of 0.2 to 2.2;
7. exposing said second light-sensitive organic layer to actinic radiation in image-receiving manner to establish a potential $R_d$ of 0.2 to 2.2;
8. applying to said second layer of organic material, free flowing phosphor particles of a second color having a diameter along at least one axis of at least 0.3 micron but less than 25 times the thickness of said second organic layer;
9. while the element is at a temperature below the melting points of the second phosphor particles and of the second organic layer, embedding said phosphor particles as a monolayer in a stratum at the surface of said second light-sensitive layer to yield an image having portions varying in density in proportion to the exposure of each portion;
10. removing non-embedded phosphor particles from said second organic layer to develop a phosphor pattern; and
11. firing said face plate to remove all of the organic material on the surface of the faceplate and fusing any unfused phosphors to said faceplate.

2. The method of fabricating upon the concave surface of a faceplate of a cathode ray tube a screen bearing sets of discrete elements of at least two different colored light emitting phosphors affixed thereon which comprise:

1. exposing to actinic radiation in image-receiving manner an element comprising a faceplate bearing a first, solid, light-sensitive organic layer capable of developing a $R_{dp}$ of 0.2 to 2.2;
2. continuing the expsoure to clear the background of said light-sensitive organic layer;
3. applying to said first layer of organic material, free flowing phosphor particles of a first color having a diameter along at least one axis of at least about 0.3 micron but less than 25 times the thickness of said first organic layer;
4. while the element is at a temperature below the melting points of the phosphor particles and of the first organic layer, embedding said phosphor particles as a monolayer in a stratum at the surface of said first organic layer to yield an image having portions varying in density in proportion to the exposure of each portion;
5. removing non-embedded phosphor particles from said first organic layer to develop a phosphor pattern;
6. coating said element with a second solid, light-sensitive organic layer having a thickness of at least 0.1 micron while maintaining said first phosphor pattern in its image-wise configuration, said second light-sensitive organic layer being capable of developing a $R_{dp}$ of 0.2 to 2.2;
7. exposing said second light-sensitive organic layer to actinic radiation in image-receiving manner to clear the background of said light-sensitive organic layer;
8. applying to said second layer of organic material, free flowing phosphor particles of a second color having a diameter along at least one axis of at least 0.3 micron but less than 25 times the thickness of said second organic layer;
9. while the element is at a temperature below the melting points of the second phosphor particles and of the second organic layer, embedding said phosphor particles as a monolayer in a stratum at the surface of said second light-sensitive layer to yield an image having portions varying in density in proportion to the exposure of each portion;

10. removing embedded phosphor particles from said second organic layer to develop a phosphor pattern; and
11. firing said faceplate to remove all of the organic material on the surface of the faceplate and fusing any unfused phosphors to said faceplate.

3. The process of claim 2 wherein said faceplate is coated after step 10 with a solid, light-sensitive organic layer having a thickness of at least 0.1 micron while maintaining the phosphors in image-wise configuration, said light-sensitive organic layer being capable of developing a $R_{dp}$ of 0.2 to 2.2; exposing said light-sensitive organic layer to actinic radiation in image-receiving manner to clear the background of said light-sensitive organic layer; applying to said organic layer, free flowing phosphor particles of a third color having a diameter along at least one axis of at least 0.3 micron but less than 25 times the thickness of said organic layer; while the layer is at a temperatuere below the melting points of the phosphor particles and of the organic layer,physically embedding said phosphor particles as a monolayer at a stratum at the surface of said light-sensitive layer to yield an image having portions varying in density in proportion to the exposure of each portion; and removing non-embedded particles from said organic layer to develop a triad of three different colored light emitting phosphors.

4. The process of claim 2 wherein said faceplate is fired after step 5 fusing said first phosphor to said faceplace and removing said first organic layer.

5. The process of claim 2 wherein said faceplate is coated after step 5 with a hydrophilic colloid to form an isolating layer.

6. The process of claim 5 wherein said isolating layer contains a tanning agent and said isolating layer is tanned uniformly by exposure to actinic radiation.

7. The process of claim 2 wherein said solid, light-sensitive organic layer is applied in step 6 from a liquid vehicle, which is a poor solvent for said first light-sensitive organic layer.

8. The process of claim 2, wherein said solid, light-sensitive organic layer applied to step 6 comprises a film-forming organic material containing no terminal ethylenically unsaturation and at least one photoactivator.

9. The process of claim 8 wherein said solid, film-forming organic material comprises an internally ethylenically unsaturated acid.

10. The process of claim 9 wherein said solid, film-forming organic material comprises a partially hydrogenated rosin acid.

11. The process of claim 8 wherein said solid-film-forming organic material comprises an ester of an internally ethylenically unsaturated acid.

12. The process of claim 11 wherein said ester comprises a partially hydrogenated rosin ester.

13. The process of claim 11 wherein said ester comprises a phosphatide.

14. The method of forming a ceramic article which comprises:
1. exposing to actinic radiation in image-receiving manner a ceramic article bearing a solid, light-sensitive organic layer capable of developing a $R_d$ of 0.2 to 2.2;
2. continuing the exposure to establish a potential $R_d$ of 0.2 to 2.2;
3. applying to said layer of organic material, free flowing fusible pigment particles having a diameter along at least one axis of at least about 0.3 micron but less than 25 times the thickness of said organic layer;
4. while the ceramic article is at a temperature below the melting points of the pigment particles and of the organic layer, embedding said pigment particles as a monolayer in a stratum at the surface of said organic layer to yield an image having portions varying in density in proportion to the exposure of each portion;
5. removing non-embedded pigment particles from said organic layers to develop a pigmented image; and
6. firing said ceramic article to fuse any unfused fusible pigment to said ceramic article and remove any organic material on said ceramic article.

15. The method of forming a ceramic article which comprises:
1. exposing to actinic radiation in image-receiving manner a ceramic article bearing a solid, light-sensitive organic layer capable of developing a $R_{dp}$ of 0.2 to 2.2;
2. continuing the exposure to clear the background of said light-sensitive organic layer;
3. applying to said layer of organic material, free flowing fusible pigment particles having a diameter along at least one axis of at least about 0.3 micron but less than 25 times the thickness of said organic layer;
4. while the element is at a temperature below the melting points of the pigment particles and of the organic layer; embedding said pigment particles as a monolayer in a stratum at the surface of said organic layer to yield an image having portions varying in density in proportion to the exposure of each portion;
5. removing non-embedded pigment particles from said organic layer to develop a pigmented image; and
6. firing said ceramic article to fuse any unfused fusible pigment to said ceramic article and remove any organic material on said ceramic article.

16. The process of claim 15 wherein said ceramic article is coated before step 6 with a second solid, light-sensitive organic layer having a thickness of at least 0.1 micron while maintaining the first pigment in image-wise configuration, said second light-sensitive organic layer being capable of developing a $R_{dp}$ of 0.2 to 2.2; exposing said light-sensitive organic layer to actinic radiation in image-receiving manner to clear the background of said light sensitive organic layer; applying to said organic layer, free flowing fusiable pigment particles of a second color having a diameter along at least one axis of at least 0.3 micron but less than 25 times the thickness of said organic layer; while the layer is at a temperature below the melting points of the pigment particles and of the organic layer, physically embedding said pigment particles as a monolayer at a stratum at the surface of said light-sensitive layer to yield an image having portions varying in density in porportion to the exposure of each portion; and removing non-embedded particles from said organic layer.

17. The process of claim 14, wherein said fusible pigment comprises a conductive metal.

18. The process of claim 17, wherein after step 5, said conductive image is overcoated with a passivating layer.

19. The process of claim 17, wherein after step 5, said conductive metal image is overcoating with a passivating layer; said ceramic article is coated with a second solid, light-sensitive organic layer having a thickness of at least 0.1 micron while maintaining the first conductive metal image in image-wise configuration, said second light-sensitive organic layer being capable of developing a $R_{dp}$ of 0.2 to 2.2; exposing said light-sensitive organic layer to actinic radiation in image-receiving manner to clear the background of said light-sensitive organic layer; applying to said organic layer, free-flowing conductive metal pigment particles having a diameter along at least one axis of at least 0.3 micron but less than 25 times the thickness of said organic layer; while the layer is at a temperature below the melting points of the pigment particles and of the organic layer, physically embedding said conductive metal particles as a monolayer at a stratum at the surface of said light-sensitive layer to yield an image having portion varying in density in proportion to the exposure of each portion; and removing non-embedded particles from said organic layer.

* * * * *

UNITED STATES PATENT AND TRADEMARK OFFICE

CERTIFICATE OF CORRECTION

PATENT NO. : 3,753,710

DATED : August 21, 1973

INVENTOR(S) : Rexford W. Jones; William B. Thompson

It is certified that error appears in the above-identified patent and that said Letters Patent are hereby corrected as shown below:

Column 4, line 37, for "or" read ---of--- (1st occurrence)
Column 5, line 20, for "with a" read ---within a---
Column 5, line 60; for "the" first occurrence, read ---this---
Column 7, line 46, for "along" read ---alone---
Column 11, line 40, for "thses" read ---these---
Column 11, line 51, for "the" read ---one---
Column 12, line 14, for "atmomizer" read ---atomizer---
Column 12, line 49, for "the" read ---one---
Column 13, line 13, for "surface face" read ---surface---
Column 13, line 15, for "cutton" read ---cotton---
Column 14, line 8, for "to" read ---be---
Column 14, line 48, for "characterisitics" read ---characteristics---
Column 15, line 25, for "facplate" read ---faceplate---
Column 17, line 4 for "gree" read ---green---
Column 20, line 28, for "expsoure" read ---exposure---
Column 21, line 1, for "embedded" read ---non-embedded---
Column 21, line 19, for "temperatuere" read ---temperature---
Column 21, line 42, for "applied to step" read --- applied in step---
Column 22, line 54, for "fusiable" read ---fusible---
Column 22, line 62, for "porportion" read ---proportion---
Column 23, line 5, for "coating" read ---coated---

Signed and Sealed this

*ninth* Day of *March 1976*

[SEAL]

*Attest:*

RUTH C. MASON
*Attesting Officer*

C. MARSHALL DANN
*Commissioner of Patents and Trademarks*